Dec. 11, 1962    C. C. DOUGLASS, JR    3,068,038
INTERCHANGEABLE TRUCK BED
Filed May 19, 1960    2 Sheets-Sheet 1
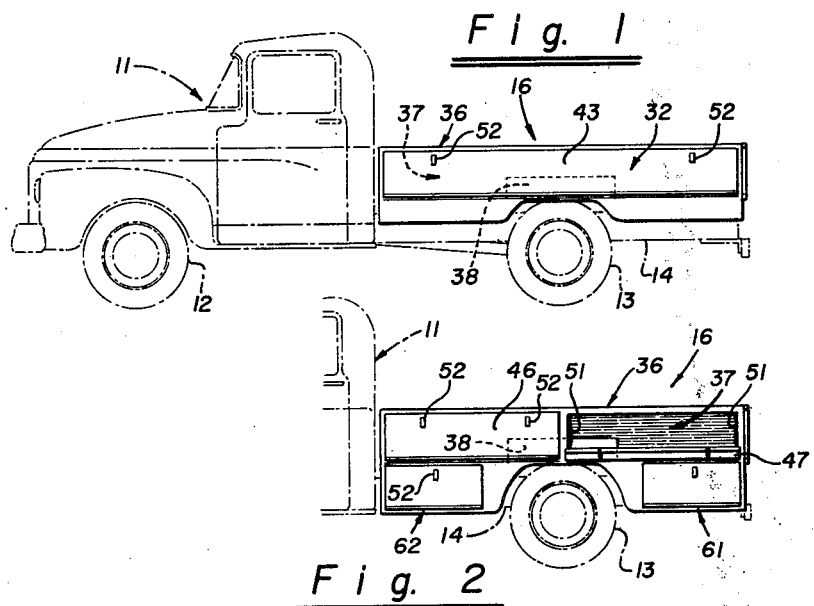
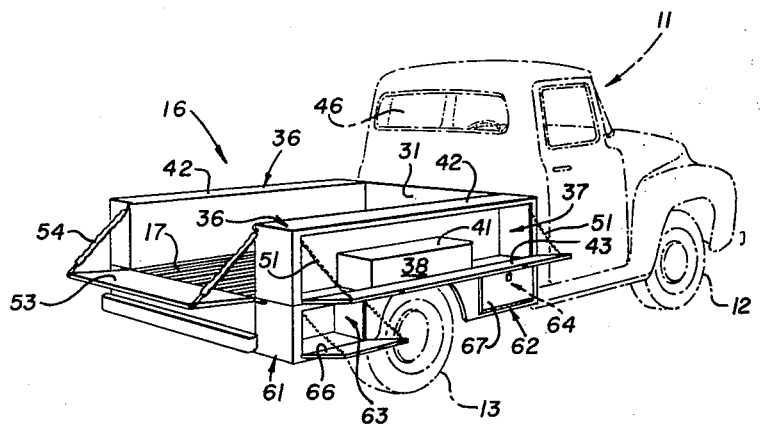
INVENTOR.
Clinton C. Douglass, Jr.
BY
Attorneys Dec. 11, 1962   C. C. DOUGLASS, JR   3,068,038
INTERCHANGEABLE TRUCK BED
Filed May 19, 1960   2 Sheets-Sheet 2

INVENTOR.
Clinton C. Douglass, Jr.
BY
Attorneys

\# United States Patent Office 3,068,038
Patented Dec. 11, 1962

3,068,038
INTERCHANGEABLE TRUCK BED
Clinton C. Douglass, Jr., 231 21st St., Bakersfield, Calif.
Filed May 19, 1960, Ser. No. 30,168
2 Claims. (Cl. 296—24)

The invention relates to interchangeable truck beds and more particularly to such beds having a low profile and having compartmented storage space for items to be transported.

Truck beds of the class having both open and compartmented storage space have generally been provided in the past by either constructing them in the factory as an integral part of the newly-manufactured vehicle, or else by mere attachment of compartments to an already existing truck, with the disadvantages that the truck is not easily adaptable to various uses or that the resulting construction is only partially suitable for its purpose. Furthermore, such truck beds have generally had poor balance and roadability when loaded and have not been well arranged for weather-protected and locked security storage of large items. Also, such beds have generally provided only limited accessibility to the various storage areas thereof, the compartments interfering with the operator's reach into the flat portion of the bed, and also interfering with the operator's rear view of the road when he is located in driving position.

It is therefore an object of the invention to provide a truck bed of the class having both open and compartmented storage space and formed as a single unitary construction for speedy and easy mounting and demounting from the frame of a truck and for rigidity and strength when so mounted, the bed being arranged for improved accessibility of all the storage areas thereof and for improved rear visibility of the operator when he is seated in driving position in the truck.

It is another object of the invention to provide a unitary truck bed as above described and adapted for improved storage of items of various shapes and sizes and with varying degrees of weather protection and locked security thereof.

It is still another object of the invention to provide a unitary truck bed as above described and having improved balance and roadability when mounted on the truck.

It is a further object of the invention to provide a generally improved interchangeable truck bed.

Other objects, together with the foregoing, are attained in the embodiment described in the following description and shown in the accompanying drawings in which:

FIGURE 1 is a side elevational view of one form of the truck bed of the invention mounted on a truck that is shown in phantom;

FIGURE 2 is a side elevation view of a modified form of the device mounted on a phantom truck;

FIGURE 3 is a perspective view of another modified form of the truck bed mounted on a phantom truck;

Figure 4:
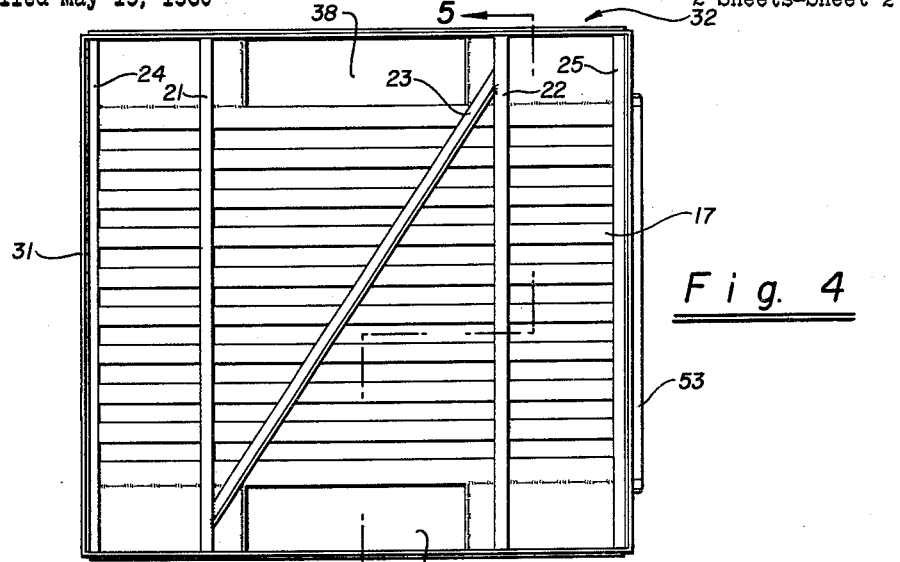
FIGURE 4 is a bottom plan view, on an enlarged scale, of the truck bed shown in FIGURE 1.

While the invention is susceptible of numerous physical embodiment, depending on the environment and requirements of use, substantial numbers of the herein shown and described embodiments have been made and used, and all have performed in a highly successful manner.

In the drawings, there is shown a truck, generally indicated by the reference numeral 11, and including an assembly of front and rear wheels 12 and 13 and a frame 14, the truck 11 being of a typical style and known as a "pickup" truck, but with the typical bed, with which such trucks are usually furnished, removed.

Figure 5:
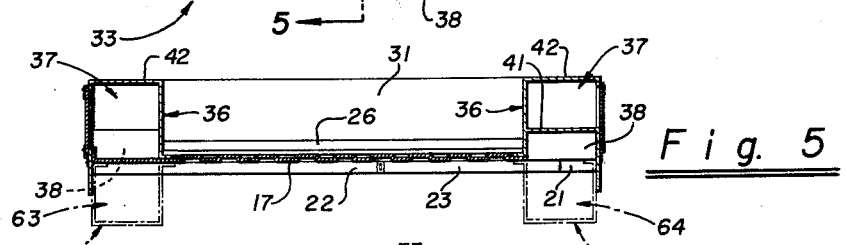
FIGURE 5 is a cross-sectional elevation view on the scale of FIGURE 4 and showing the truck bed thereof and, in phantom, portions of the bed of FIGURE 3, the plane of the section being taken substantially along the lines 5—5 of FIGURE 4.
Figure 6:
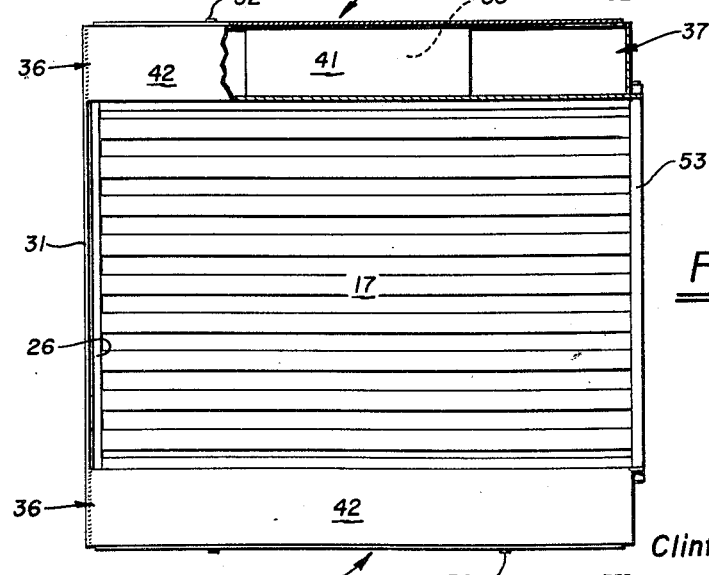
FIGURE 6 is a top plan view to the scale of and showing the bed of FIGURE 4, the figure being broken away more clearly to show details of the construction.

The truck bed of the invention, generally designated by the reference numeral 16 (FIGURE 1), includes a flat, rigid floor member 17 (FIGURES 4–6) here shown as being formed of corrugated metal with the corrugations running forwardly-rearwardly of the member for forward-rearward rigidity, and with cross-bracing members 21, 22, 23, 24, 25 and 26 appropriately affixed thereto, as by welding, for example, for crosswise rigidity.

As an important feature of the invention, the transverse members 21–24 extend entirely across the truck bed and serve not only to support the floor member but also the various boxes, later to be described, outboard from the flooring. The cross-members 21–24, furthermore, are spaced apart at predetermined distances so that any of the various kinds of boxes, to be described hereafter and which are formed to modular dimensions, can easily be installed and, if necessary, interchanged. In addition, the cross-members are prepunched or are provided with a plurality of openings to facilitate mounting the device on the truck body and at any one of a number of locations (within limits) on the body, thus permitting a substantial choice of placement.

Extending from the floor member 17 is an upstanding front wall 31 and a pair of upstanding side walls, generally designated by the reference numerals 32 and 33, the front and side walls being connected to form with the floor member a rigid box-like structure.

Each of the side walls 32 and 33 is formed as a box 36 defining a hollow compartment 37 extending the full length of the side wall from front to rear and opening laterally outwardly. Each box 36 has a re-entrant cavity 38 formed in the bottom portion thereof presenting a wheel well registering with the corresponding wheel 13 and accommodating movement of the wheel with relation to the frame 14. The wheel cavity 38 not only permits of a lower center of gravity but also a lower location for the box tops, thus giving greater convenience to the user, and better visibility. It will be noted that the compartment 37 has a clear run from front to rear even though there is a decreased vertical space between the top wall 41 of the cavity 38 and the top wall 42 of the box 36. This form of compartment is therefore especially suitable for storage and transportation of very long items, such as shovels, pipes or fishing rods, and for protecting such items from the weather.

As an important feature of the invention the side walls 32 and 33 of the truck bed are dimensioned to extend upwardly and to terminate at substantially less than shoulder height above the level of the ground when the bed is mounted as described on the truck 11. As a consequence of this low profile construction, an operator standing at the side of the truck can easily and conveniently reach far across the floor member 17 to obtain articles carried by the floor member. This low profile, in addition to providing a clean cut appearance, has also the advantage of leaving the view through the rear window 46 of the truck cab relatively unobstructed; and at the same time it is ensured that articles stored in the compartments 37 are caused to maintain the center of gravity of the truck quite low, resulting in increased safety of balance and roadability of the truck, especially while cornering. Further to increase the balance and stability of the bed, the device is formed to extend equi-distantly forwardly and rearwardly of the re-entrant wheel cavities 38, ensuring that any load when equally distributed on the bed will be balanced over the rear axle joining the wheels 13.

For additional weather protection and for locked security of the compartments 37, each box 36 is provided with at least one downwardly and laterally outwardly swinging door 43 (FIGURE 1), or two such doors 46 and 47 as shown in the modified form of FIGURE 2, the doors being restrained for a desired arc of swing by means of chains 51 attached thereto and to the box 36, and being provided with lock latches 52 to secure them in closed position. The truck bed itself is also provided with a downwardly and rearwardly swinging tail gate 53 secured by chains 54 and latching means such as are well known in the art.

In a further modified form of the invention, shown in FIGURE 3 (and a feature thereof in FIGURE 2), the bed 16 is formed with each of the side walls 32 and 33 extended downwardly as by attachment of a pair of downwardly depending box-like portions 61 and 62 defining additional compartments 63 and 64 opening laterally outwardly and closed by downwardly and laterally outwardly swinging doors 66 and 67; the box-like portions 61 and 62 being located respectively just rearwardly and just forwardly of the wheel cavity 38 and consequently of the wheel 13. It will be seen that such compartments increase the storage capacity of the truck bed and also help to lower the center of gravity of the truck, either loaded or empty.

What is claimed is:

1. In combination with the wheels and body frame assembly of a pickup truck with a rear view window, a unitary interchangeable low-profile truck bed comprising: a flat rigid floor member horizontally and removably mounted on said body frame between the wheels of said assembly; side walls mounted on and extending upwardly from said floor member and terminating at an elevation substantially below said rear view window; an elongated box mounted on each of said side walls, said box being located over a subjacent wheel and defining an elongated compartment extending upwardly from the plane of said floor member; and an upwardly projecting wheel well formed in the bottom portion of said box over said wheel, the plane of said floor member and the plane of the bottom of said elongated box being substantially coplanar and coincident with the top portion of the tire of said wheels; and door means on the outer sides of said elongated boxes, which when open, expose the entire interior length of said boxes, including that portion above said wheel wells.

2. The device of claim 1 further characterized by a pair of downwardly depending box portions beneath said first-named box and positioned forwardly and rearwardly of said wheel well at a distance substantially equal to the radial dimension of said tire of said wheel.

References Cited in the file of this patent

UNITED STATES PATENTS

| | | |
|---|---|---|
| 2,380,557 | Terry | July 31, 1945 |
| 2,426,772 | Holan et al. | Sept. 2, 1947 |
| 2,722,352 | Dehnel | Nov. 1, 1955 |
| 2,772,913 | Holan et al. | Dec. 4, 1956 |
| 2,978,153 | Brindle | Apr. 4, 1961 |

OTHER REFERENCES

J. H. Holan publication, "Holan General Service Bodies for Chassis With ¾ to 1 Ton Rating," pages 3 of 4 pages, 1956.